United States Patent [19]

Ricci et al.

[11] 3,965,335
[45] June 22, 1976

[54] PROGRAMABLE DATA ENTRY SYSTEM

[75] Inventors: Vincent C. Ricci, Upper Darby; Lester M. Spandorfer, Cheltenham, both of Pa.

[73] Assignee: Sperry Rand Corporation, Blue Bell, Pa.

[22] Filed: Sept. 27, 1974

[21] Appl. No.: 509,808

[52] U.S. Cl. .................... 235/61.9 R; 235/61.6 R; 340/150; 340/172.5
[51] Int. Cl.² .................... G06K 1/16; G06F 7/06
[58] Field of Search ............ 235/61.6 R, 61.6 D, 235/61.9 R, 61.11 E, 61.11 A, 61.7 B, 61.11 R; 340/172.5, 149 A, 152, 150

[56] References Cited
UNITED STATES PATENTS

| | | | |
|---|---|---|---|
| 3,072,328 | 1/1963 | Bewley | 235/61.1 |
| 3,275,995 | 9/1966 | Hagopian | 340/172.5 |
| 3,335,407 | 8/1967 | Lange | 340/172.5 |
| 3,486,005 | 12/1969 | Logerwell | 235/61.6 R |
| 3,699,520 | 10/1972 | Frayssinoux | 340/150 |
| 3,825,726 | 7/1974 | Dorr | 235/61.6 R |
| 3,860,793 | 1/1975 | Roe | 235/61.9 R |

*Primary Examiner*—Daryl W. Cook
*Assistant Examiner*—Robert M. Kilgore
*Attorney, Agent, or Firm*—John B. Sowell

[57] ABSTRACT

An internally programable data entry system having a microprogram memory, a microprocessor logic and programable storage means for storing program data and constant data. The data entry system permits program data and constant data to be automatically loaded into the storage means from prepared punch cards having indicia and data thereon which identifies the type of data being entered in the storage means, the address for storing said data and a chained address which indicates the address of the next program to be used after the program currently in progress is completed.

10 Claims, 8 Drawing Figures

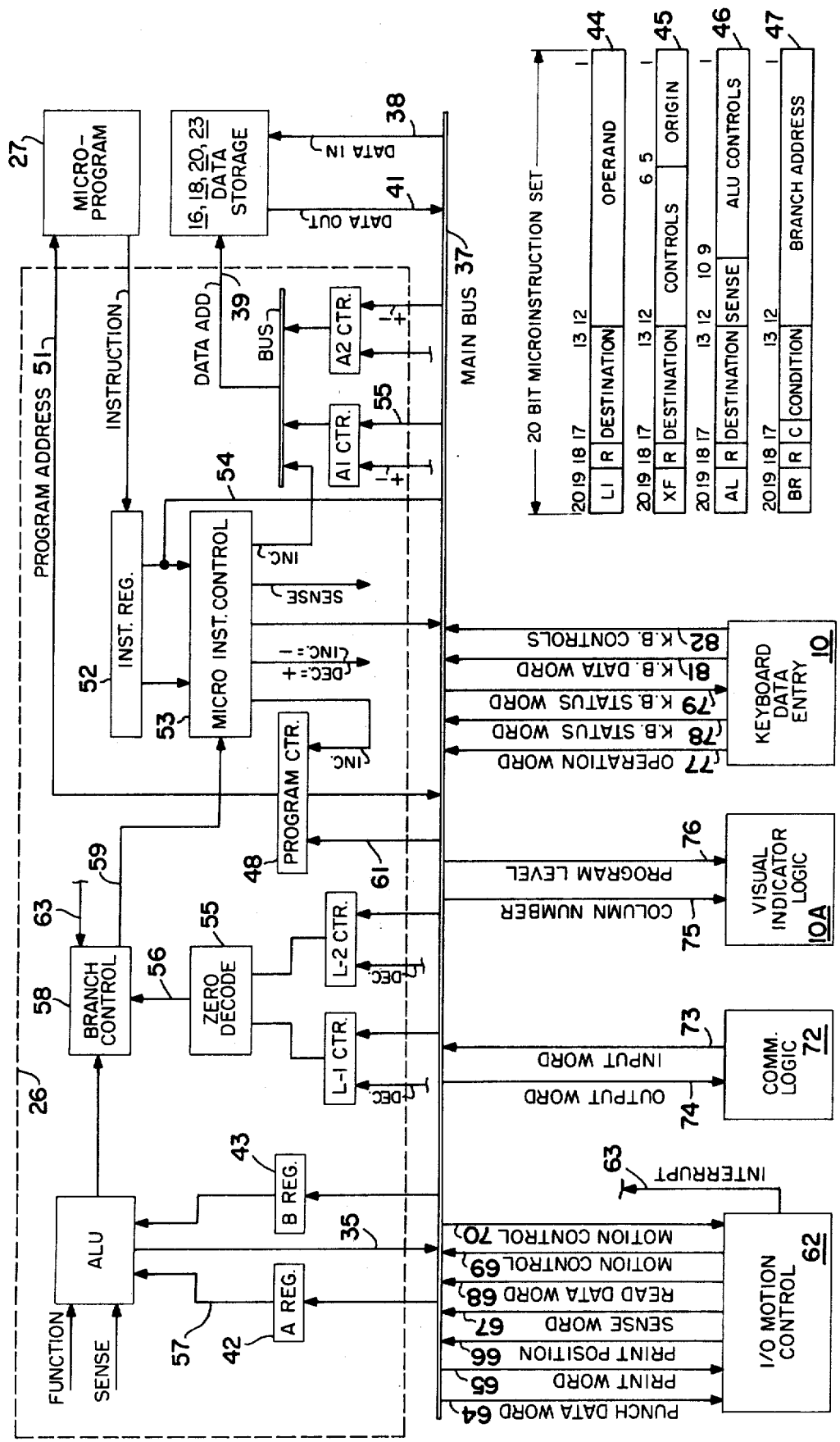

PROGRAMABLE DATA ENTRY SYSTEM

BACKGROUND OF THE INVENTION

1. Field of the Invention

This invention relates to data entry devices and systems. More particularly, the invention relates to an improved key station data entry system for use in preparing keypunched cards.

2. Description of the Prior Art

Keypunch systems employing internal memory are well known. A typical well known prior art keypunch system is the SPERRY UNIVAC 1700 series card keypunch machine described in U.S. Pat. No. 3,360,781. Such prior art systems are provided with a magnetic core memory for storing program data. To load the magnetic core memory, a special master program card is prepared by punching program data in the columns provided on a standard punch card. The prepared master card is then inserted into the input magazine of the keypunch system and the key station is manually set to indicate that a program is being loaded. When the memory of the keypunch system is limited to a single punch card, no election of a memory address is necessary and the single address memory can be hard-wired into the system. When several program areas are provided in the memory, additional manual address selection means are necessary to indicate the proper address. Rotary selection switches have been used to indicate the memory address or program level. In a similar manner, when data to be recorded in memory are to be recalled for later use (such as constant data), additional manual address selection means are necessary to indicate a different mode of operation and/or a different address area.

The prior art procedure for loading programs and constant data into a memory of a keypunch system is rather complex and does not provide a permanent record of every step that has taken place. For example, the data on a program card may be manually entered in a plurality of addresses in memory, or the constant data may be entered into a program address area depending on the manual selection of an address by the operator. If the master cards are shuffled or inadvertently disarranged between entry, there are no means provided on the master cards to insure that the program data or constant data will be stored in the same addresses that were selected by the operator when the master cards were used before.

Some keypunch operators are more skilled than others and, regardless of the complexity of the procedures to be followed, will consistently make fewer errors than an average operator. After an average operator has learned a standard procedure, and the standard procedure repeated, both speed and accuracy of data entry is improved.

Heretofore, procedures employed for loading the internal memory of a data entry system prior to preparing punch cards have not been routine and have required numerous manual steps which vary with the type of data being stored and entered. The address in which the data is to be entered may be changed or improperly selected by the keypunch operator.

Both the accuracy and speed of producing punch cards could be enhanced if the keypunch system did not require the operator to perform non-standard routines or functions on the keyboards which are considered to be non-standard key functions.

SUMMARY OF THE INVENTION

The present invention permits an operator to insert a set of random sorted master cards into the input of a keypunch system and have the program data and the constant data entered automatically into the correct addresses and the correct data areas of the internal memory.

The present invention provides a permanent punched record, and visual record if desired, of each of the punched master cards which are automatically read and stored in the internal memory. Each master card program which is stored in memory may be automatically chained to another card program so that more than one card program may become automatically operable during the preparation of a punched card or cards.

The present invention utilizes a solid state random access memory which permits program data to be stored in all memory levels. Some of the same memory levels may be employed to store constant data.

The random access internal memory is modular in nature and the memory level may be doubled in size by the addition of memory level structure without the necessity of modification of other parts of the data entry system.

The principal object of the present invention is to provide means for automatically loading program data and auxiliary data of a constant nature in a data entry system and providing means for automatically utilizing the stored data.

Another object of the present invention is to provide means for chaining or connecting program memory levels one to another.

Another general object of the present invention is to provide a punch card data entry system which enables an operator to perform most key functions automatically which can be performed manually.

In accordance with these and other objects of the present invention, there is provided an internally programable data entry system having an input for receiving a plurality of prepared master cards which may have either program data or constant data entered thereon. Indicia means are provided on each card in an area of the card outside of the standard data columns which includes the type of data punched into the card and the address in which said data is to be stored in the programable storage means. Each program data card also provides within said indicia means a chaining address which is an indication of the address of the next program level or memory level to become operable after the program level in operation is complete.

BRIEF DESCRIPTION OF THE DRAWINGS

FIG. 7 is a schematic block diagram showing the essential elements of microprocessor 26 in relation to FIG. 8 is a block diagram of the four basic formats of microinstruction set.

DESCRIPTION OF THE PREFERRED EMBODIMENT

Figure 1:
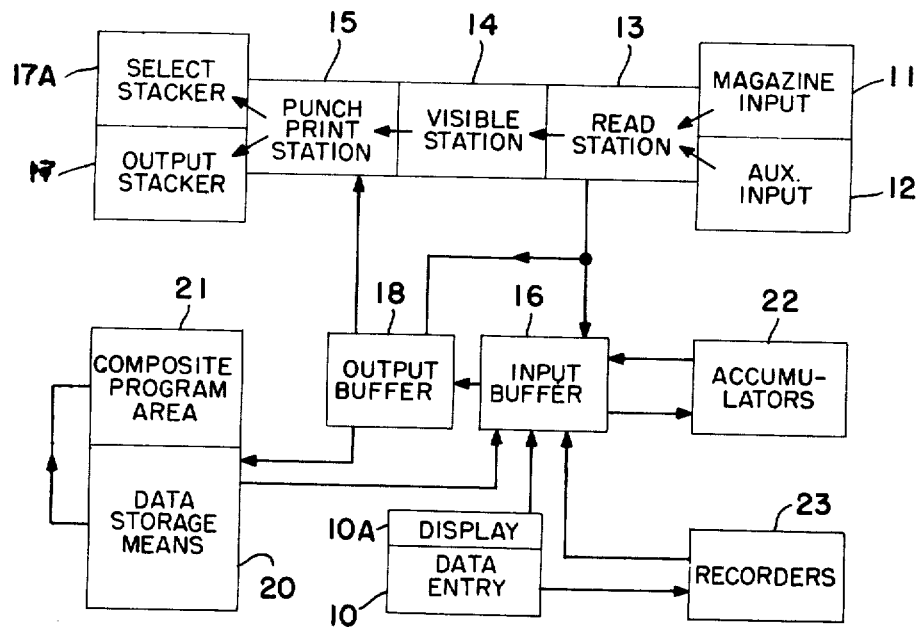
FIG. 1 is a schematic block diagram showing data flow between the major input-output devices of the data entry system.

Referring now to FIG. 1, there is shown a data flow diagram which comprises the major processing elements of the data entry system. Data entry station 10 comprises an operator keyboard provided with complete alpha and numeric keys, numerous additional function keys and function control switches. Five operational modes are provided which include preparation, loading, punching, verifying and interpreting. For purposes of this explanation, cards employed in the system may be blank cards to be punched with data, master cards which provide program data or constant data for cards to be punched, punched cards to be interpreted or printed, punched cards to be verified, punched cards to be partially or totally duplicated.

Master cards are usually prepared from source data employing blank cards but may be prepared from partially punched master cards. To prepare master cards, blank cards are placed in the magazine input 11 or auxiliary input 12 and are advanced through the feed station 13 to the visual station 14. When the PREPARATION switch is on, and the HOME key is depressed on data entry means 10, the master card will be advanced and properly located in the visual station 14 at a ready position for punching keyboard entered indicia into column 0 and the standard columns 1 to 80 which follow. The prior art keypunch machines have not been designed to feed or punch indicia in column 0. The preferred embodiment microprograms and associated hardware have been designed to properly position the master cards for reading and punching operations in column 0. When the PREPARATION switch is off, all of the normal keypunch functions are active to position a regular standard card being prepared by the operator under program control for entry of information in only columns 1 to 80. When the HOME key is depressed with the PREPARATION switch off, the card is positioned at column 1 ready for the entry of information from input buffer 16. When the desired information is entered into the keyboard of data entry means 10 and is passed into input buffer 16, and the feed key is depressed with the PREPARATION switch off, the card in the visual station 14 is passed through the punch-print station 15 for punching in standard columns 1 through 80. At the same time a card from the input means 11 or 12 is being fed through the read station 13 and positioned in the visual station 14 at column 1 subsequent to entry of information into buffer 16 for the next punching operation.

In the preferred embodiment, the card is set for indicia to be entered in column 0, which occurs before the standard columns starting at column 1. If the master card is to be provided with constant data (auxiliary data), the auxiliary data storage address is keyed in column 0 followed by the data in the required field. As this information is keyed into the data entry means 10, it is simultaneously being stored into input buffers 16. When the operator depresses a feed key (not shown), the blank card is punched and printed at the punch-print station 15 and ejected into output stacker 17 in condition for use as a constant data master card. Preparation of a program master card starts by homing the blank card to column 0. A program level address is then entered in the indicia field area, and if chaining is desired, the chaining address is also entered in the indicia field followed by keying of the program codes and each of the program fields to be established. Depression of the feed key causes the data in input buffer 16 to be transferred to output buffer 18 and to be punched and printed into the blank card which is ejected into output stackers 17.

When the operator depresses the feed key after the entry of data into the input buffer while in the preparation mode, the data of the input buffer 16 are automatically duplicated in the output buffer 18. The data in output buffer 18 are automatically punched into the blank card supplied from magazine input 11. If the feed key is again depressed, the data in input buffer 16 are again transferred into output buffer 18 and another card is fed from magazine input 11 and is punched with the data residing in output buffer 18. The operator may begin preparation of another master card after depressing the feed key since the data needed for printing and punching has been transferred to the output buffer 18 and input buffer 16 is in condition to immediately receive data from data entry means 10.

After a set of master cards which may comprise one or more program data cards supplemented by constant data cards are prepared, they may be employed to program the data entry system. The set of master cards may be entered singularly in auxiliary input 12 or bulk loaded in magazine 11. The function control switch on the keyboard of data entry means 10 is placed in the load mode. When the feed key on the keyboard of data entry means 10 is depressed, the first card is fed into read station 13 causing the data punched into the master card to be stored into output buffer 18. The input-output (I/O) control means, to be explained hereinafter, examines the contents of output buffer 18 determining whether the master card contains program data or constant data and the address in data storage means for storing the contents of output buffer 18. Each depression of the feed key of data entry means 10 will cause an additional master card to be advanced through read station 13 and the information read therefrom first stored in output buffer 18 and subsequently stored in data storage means 20.

After a set of master cards are entered into the data entry system and stored in the data storage means 20, the operator may begin preparing punched cards employing the stored programs and auxiliary data. The operator may select the first operable program by depressing a program select key on the keyboard of the data entry means followed by a desired number representing the program level address of the formerly stored master card program data. Visual means 10A are provided to verify that the desired program has been selected. If a program level number is keyed into the keyboard which does not correspond to a stored program, an error indication will be displayed in the visual display 10A.

In the automatic punch mode, the operator selects the first program level to become operable causing the program level selected to be automatically transferred to the composite program area 21. The keyboard of the data entry means 10 is placed in the punch mode and may be supplemented by the print mode as well as having the chaining feature operable. When the chaining feature is operable at the end of a program operation, the next address indicated in the indicia column causes the next program level in data storage means 20 to be automatically deposited in composite program area 21 and to automatically become operable. Constant data which was stored in data storage means 20 may be automatically transferred to input buffer 16 under control of the operable program. Data automatically transferred to input buffer 16 under the control of the operable program or data entered from data entry means 10 may be transferred from the input buffer 16 to accumulators 22, and sums or accumulated totals stored in accumulators 22 may be transferred to input buffer 16 to complete the information representative of a card to be punched. After the complete information is assembled in input buffer 16, the feed key is depressed causing the contents of input buffer 16 to be transferred to output buffer 18 and the contents of output buffers 18 to be punched into a card in punch print station 15. Statistical data is entered into recorders 23 representative of the number of key stroke entries, number of verify corrections, number of cards employed, and this information may be transferred to input buffers 16 where it is available for read-out as a punched or printed card.

In the automatic punch mode, a program level is selected and the selected program automatically enters data into the fields designated for automatic entry by the program. The fields left for manual entry are keyed in by the operator. Once the number of columns to be entered into a card have been completed either manually or automatically, the card is automatically punched and printed and the card passes into the output stacker. Automatically a new card is fed into the visible station 14 in preparation for a similar operation. In the manual punch mode all characters are keyed into the input buffer 16. The operator must depress the feed key upon completion of keying of the information for a card to cause the card to be punched and printed. The punched card is passed to the output stacker and a new card is fed into the visible station automatically.

Figure 2:
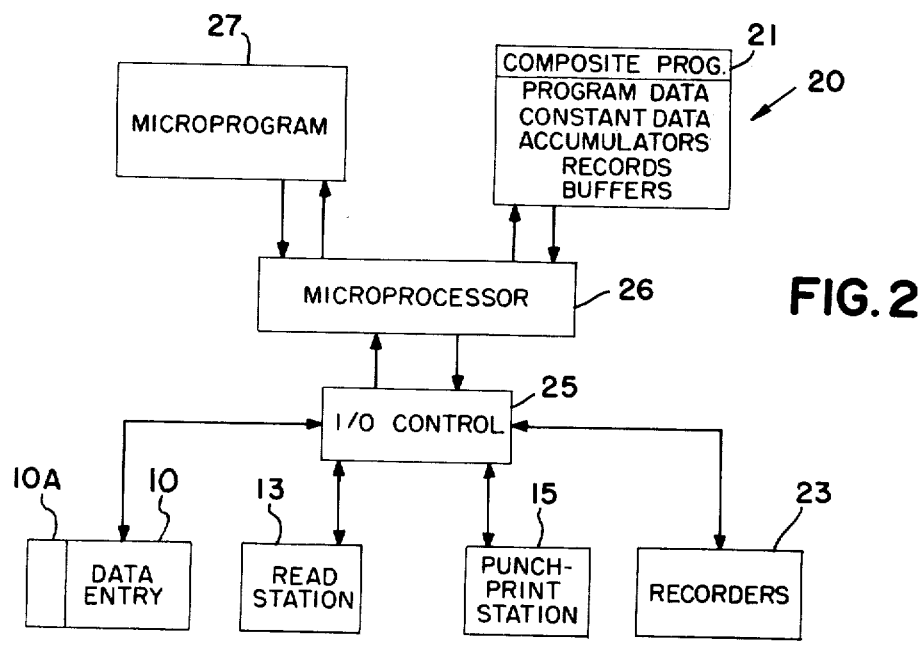
FIG. 2 is a schematic block diagram showing control line flow between the major input-output devices of the data entry system.

Referring now to FIG. 2, there is shown a control flow diagram which comprises the major processing elements of the data entry system. Data entry means 10 which comprises the operator keyboard is provided with alpha numeric keys, numerous additional function keys and function control switches. The input-output (I/0) control module 25 is the interface between the microprocessor 26 and the data entry means 10, read station 13, punch print station 15 and the production counter or recorders 23. Microprocessor 26 is in effect a miniature computer capable of performing logic steps and sequencing through a program. Such miniature computers are well known and preferably comprise standard modular blocks, small scale, medium scale or large scale integrated circuitry. The microprogram module 27 is employed to store instuctions for the microprocessor 26 operations. Program sequences are controlled by microprogram instructions as they are sequentially executed by the microprocessor 26. Microprogram module 27 is basically a fixed storage which may employ wired components logic or semiconductor logic. Preferably, microprogram module 27 is a read only memory.

Data storage means 20 and composite program area 21 are employed for use as variable storage. Inputs into the variable storage may be supplied from the keyboard or from pre-punched cards. This variable storage is later read out when called upon by the operator or other automatic program control. Input, or write instructions, and output, or read instructions, for the variable storage are executed by the microprocessor 26.

Figure 3:
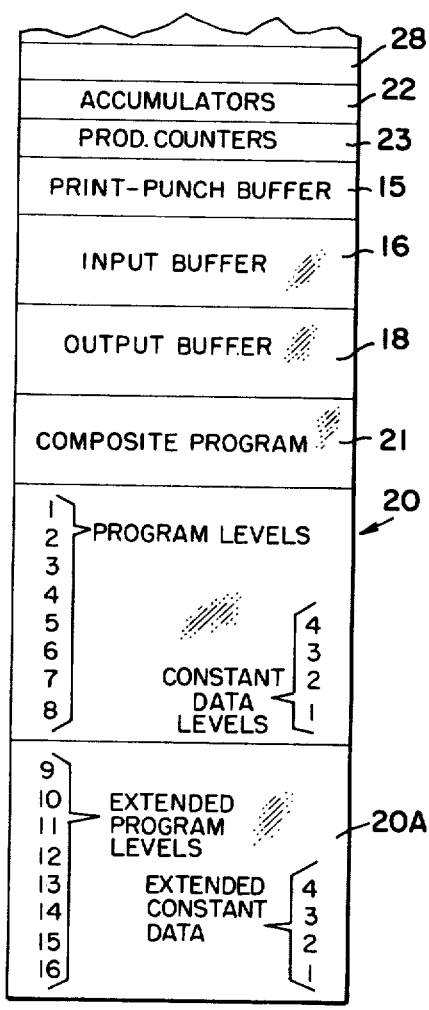
FIG. 3 is a memory map showing the divisions of the variable memory which comprise the data storage means.

Refer now to FIG. 3 showing a memory map for the variable storage comprising data storage means 20 and composite program area 21. Data storage means 20 is provided with 8 addressable program levels in which program data may be stored. Also, the last 4 program levels, levels 5 through 8, are identifiable and addressable as constant data levels 4 through 1. Thus, if program address level 8 is not employed, it is ordinarily used for auxiliary data or constant data as data address level 1. Data storage means 20 may be extended by providing an extension memory 20A which extends the addressable program levels to 16. In the extended program level embodiment, the constant data levels 4 to 1 are ordinarily eliminated and permanent extended constant data levels 4 to 1 as shown in module 20A are provided. It is to be noted that the program level and constant data level memory may be universal in that they can be used for both programs and constant data or separated if capacity permits. As explained hereinbefore, the active or operational program in data storage means 20 is transferred to the composite program storage register 21. When another program is to be executed, it is transferred into the composite program storage area 21 destroying the previous program stored therein. The input buffer 16 and output buffer 18 shown in FIG. 1 are in the same bank of variable memory as the data storage means 20. In similar manner, the variable storage provided for punch-print buffer 15, production counters 23 and accumulators 22 are assembled in the variable storage module. There is also provided additional memory such as scratch pad memory 28 which is employed for other functions not a part of this invention.

Figure 4:
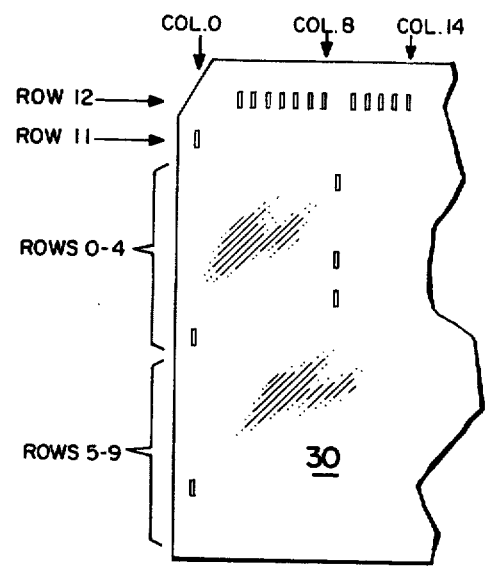
FIGS. 4 to 6 are punch cards of the type employed in automatic programming of the data entry system.
Figure 5:
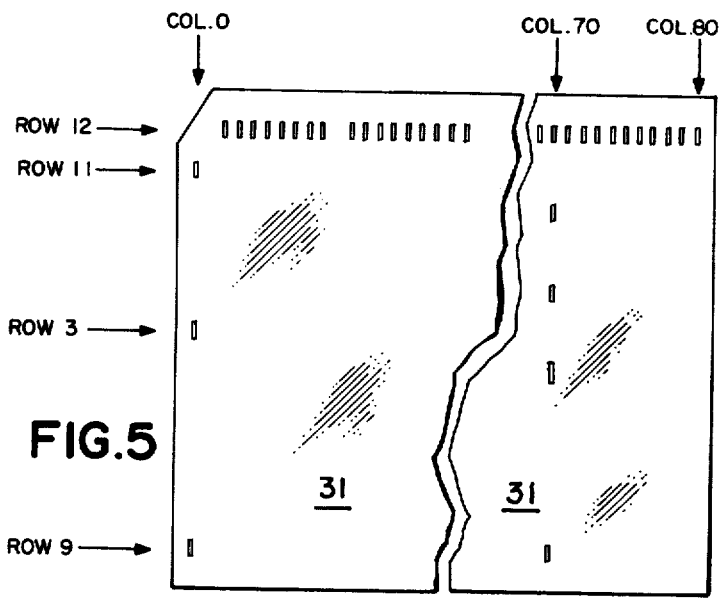
Figure 6:
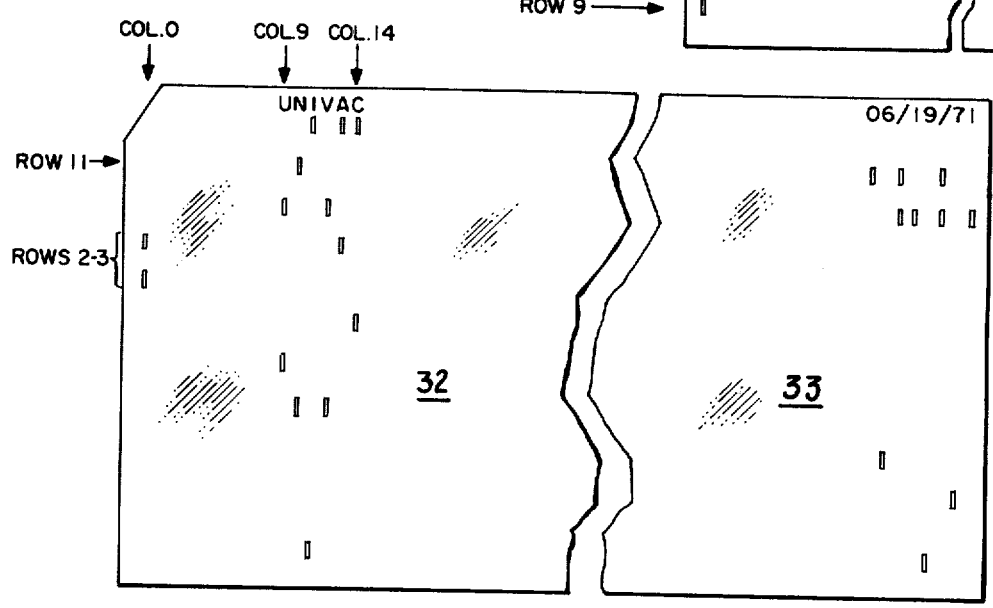

Refer now to FIGS. 4 to 6 showing punch cards of the type employed in automatically loading the data storage means 20. Card 30 is a program card as indicated by indicia punched in column 0 at row 11. The indicia punched in rows 0 to 4 of column 0 are indicative of the address in data storage means 20 in which program card information will be stored. Column 0, row 4, is punched to indicate program storage level 1. Column 0, rows 5 to 9, indicate the address of the next program card chained to program card 30. Column 0, row 8, is punched to indicate the program level 2. Row 12 is punched from column 1 through column 8 to indicate that a manual entry is required. After the last entry in column 8, the program will automatically duplicate the contents of constant data level 1 which starts at column 9 and ends at column 14 as indicated by the field coding in row 12 of card 30.

Card 31 is another program card or master card as indicated by the punch in column 0 of row 11. The address in column 0 punched at row 3 indicates that the information on card 31 is to be stored in program level 2 or address level 2 of data storage means 20. The punching in row 9 of column 0 indicates that card 31 is chained back to address level or program level 1 which is indicative of the information in card 30. The breaks in the punching of row 12 indicate the start and stop of field in the punching of row 12 indicate the start and stop of field operations. Column 70 indicates the start of an operation which is indicated to be duplicate from auxiliary storage level (constant data storage level) 2. When the 80th column is automatically entered during a punch operation, the program card 31 which was ransferred to the composite program level 21 is automatically replaced with the contents of program level 1 card 30). The card being punched is automatically iunched and a new card is fed into the visible station 4 in preparation for another card punch operation.

Card 32 is not punched in column 0 of row 11 indicating that the master card contains constant data to be tored in one of the constant data levels. Rows 2 and 3 if column 0 are punched to indicate that the information in card 32 is to be stored in constant data level 1. Columns 9 through 14 are punched with alpha numeric onstant data indicative of the name Univac.

Constant data in card 33 could be stored in auxiliary torage or constant data level 1, but for purposes of this llustration, it will be assumed to contain constant data aving information to be stored in auxiliary level or constant data level 2. Card 31 was shown as being iunched in columns 70 to 80 which requires duplication of information from auxiliary level or constant lata level 2. The constant data in columns 70 to 80 of evel 2 were supplied by card 33 and contain the date une 19, 1971. The above examples of master cards, rogram data cards and constant data cards illustrate hat indicia may be placed in column 0 which identifies he type of information which follows in the standard columns 1 through 80. The indicia in column 0 also ndicates the address in data storage means 20 in which he information will be stored. The indicia also indiates whether the information is programed data or constant data by punched indicia or the absence of ounched indicia in column 0, row 11. The information n the program card may be stored in one of the program levels as identified by the address in column 0, ows 0 to 4. Further, it is understood that when the nformation in the master card or program card is program data, the program card or program may be chained to another program card. It will be understood hat each program card may be chained to another orogram card, and the last program card in the chain nay be chained back to the original or any one of the other program cards. The only limitation in chaining is the number of program levels provided in the data storage means 20. For this preferred embodiment illustrated 16 program levels have been shown. Programs of enormous complexity can be employed in automatically punching a series of cards in which only the changed information is required to be entered manually by an operator.

It has been explained how an operator can prepare both program cards and constant data cards. It has also been explained how a set of such prepared master cards are placed in the bulk loading magazine input 11 or singularly in the auxiliary input 12 to be loaded in the data storage means 20. It was explained that during loading of the program that the function switch on data entry means 10 is placed in the load mode and as the feed key is depressed on the keyboard, each card is passed to read station 13. Depression of the feed key causes a punched card to be advanced column by column through the read station 13 and the information punched therein is stored in the output buffer 18 as a card image.

Refer now to FIGS. 1 and 7 showing in block diagram, the flow of data and the essential elements of microprocessor 26. As the master card is read by read station 13, the indicia being read column by column is presented on line 68 to main bus 37 under control of microprogram 27. The information is entered into output buffer 18 via input line 38. As will be explained, address counter A1 designates the output buffer 18 on data address line 39. After all 81 columns are read from the master card and the output buffer 18 is completely loaded, the microprocessor 26 continues through a microprogram sequence which will cause the address counter A2 to be set with the address of the destination of the contents of output buffer 18, and address counter A1 will enable output buffer 18 as the origin of the information to be stored in data storage means 20. The master card information image in buffer 18 of data storage means 20 is routed on line 41 to main bus 37 and entered on input line 38 to the proper program level or constant data storage level as the case may be.

The address information in column 0 of output buffer 18 is routed via output line 41 and main bus 37 and is set in address registers 42 or 43. Under control of the microprogram sequence in operation, the address is applied via arithmetic logic unit 34, line 35, and main bus 37 to address counter A2 which now designates or enables the destination address of the information to be stored in data storage means 20.

FIG. 8 is a block diagram showing schematically the four basic formats used for the thousands of microinstructions which are permanently set in the microprogram 27.

The basic format instruction 44 is a load immediate (LI) instruction as indicated by the two bits in columns 20 and 19. Column 18 is the return bit (R) which is supplied in each of the microinstruction formats to allow any one of the instructions to end a subroutine following its execution. The load immediate instruction transfers the 12 bit operand in columns 12 to 1 of the instruction to the address of the specified destination.

The basic format instruction 45 illustrates a transfer (XF) instruction which transfers the contents of the specified origin in columns 5 to 1 to the specified destination in columns 17 to 13. The control field columns 12 to 6 enables independent stepping of the address counters A1 and A2 and the loop control counters L1 and L2 as will be explained hereinafter.

The basic format instruction 46 is the arithmetic logic (AL) instruction which performs the function specified by the ALU 34 controls on the contents of the A and B registers 42 and 43 and transfers the results (of the logical function) to the specified destination in columns 17 to 13 of basic format 46. The sense function in columns 12 to 10 can cause the ALU to sense for carry, zero or sign. The ALU controls in columns 9 to 1 define the function to be performed by the arithmetic control unit logic such as the transfer of the register information to the address counter A1 as previously described.

The basic format instruction 47 is a branch (BR) instruction which transfers the 12 bit branch address in columns 12 to 1 to the program counter 48 if and when the specified condition in columns 16 to 13 is met. The call bit in column 17 is not employed for purposes of this invention. The condition field columns 16 to 13 may select the carry, zero, sign, L1 equals 0, L2 equals 0, an interrupt request or no condition as the case may be.

A specific example of how the microprocessor 26 is programed to take the information in output buffer 18 and transfer it to a program or constant data address in data storage means 20 will now be explained with reference to FIG. 7. Microinstruction address 125 of microprogram 27 contains a load immediate (LI) instruction.

The destination indicated in the address location 125 is the address of address counter A1. The operand indicated in the address location 125 is indicative of the beginning or start of the address of the output buffer 18. Microinstruction address 125 becomes active as a result of the microprogram counter 48 being stepped to address location 125 which causes the active address on program address line 51 to be set into microprogram memory 27. A preferred embodiment of microprogram memory 27 which comprises commercially available solid state read only memory (ROM) integrated circuits such as those sold by National Semiconductor Company (Series MM5232BPB/J) or sold by Mostek (Series MK25150 to 21290). These integrated circuit chips contain 4096 bits of memory. Each chip is provided with a 1024 by 4 array, thus, 20 columns of 20 chips may be arranged to provide 4096 separate 20-bit ROM instructions which may be employed as the microprogram 27. It will be understood that a 12-bit address applied to each of the integrated circuit chips is capable of defining one of 4096 possible outputs from each chip.

When program counter 48 calls for an instruction from microprogram 27, the microinstruction is transferred to instruction register 52 for execution. Instruction register 52 is wired as a parallel-in and parallel-out register. The 20 instruction inputs and 20 instruction outputs correspond to the 20 columns of a microinstruction. A preferred embodiment solid state integrated circuit instruction register may be made by employing five integrated circuit chips such as the Texas Instrument SN 7495A four bit right or left shift register wired for parallel input and parallel output.

The load immediate (LI) instruction in columns 20 and 19 of address 125 transfers the 12-bit operand in column 12 to 1 via line 54 to the main bus 37 and to memory address counter A1 under control of microinstruction controls 53. This address, stored in address counter A1, indicates the start or origin of data in column 0 of input buffer 16. Input buffer 16 contains a 12 by 81-bit card image. Output line 41 provides for the parallel transfer of 12 bits or a single column of information in parallel. Memory address counter A1 will be incremented by the microinstruction controls 53 to step the address location through the 81 columns or addresses corresponding to the 81 columns of the card stored in output buffer 18.

After memory address counter A1 is loaded, the microprogram counter 48 steps the counter to the next microinstruction address 126 which contains a load immediate instruction in columns 20 and 19, the coded designation for memory address counter A2 in the destination columns 17 to 13 and the beginning address of the program level 1 of data storage means 20 in the operand columns 12 to 1. This microinstruction indicates that the destination of the data to be transferred from output buffer 16 is a program level 1 of data storage means 20. The address in operand columns 12 to 1 is transferred from instruction register 52 via line 54 and main bus 37 to memory address counter A2.

Microprogram counter 48 is again sequenced and address 127 in microprogram 27 is transferred to instruction register 52. This instruction is another load immediate (LI) instruction having the coded address for loop counter L-1 stored in the destination column 17 to 13 and the coded address number 81 stored in the operand columns 12 to 1. This microinstruction indicates that the number 81 will be set in loop counter L-1. As each of the 12 bit columns of data is transferred from input buffer 16, the loop counter L-1 will be decremented one count. When loop counter L-1 is decremented to the count of zero, the zero decoder 55 will sense that the 81 columns of data have been transferred and produce a signal on line 56 indicating that the transfer of data is complete as will be explained hereinafter.

Microprogram counter 48 is sequenced again and address 128 is transferred from microprogram 27 to instruction register 52. This instruction is a transfer (XF) instruction having the transfer designations stored in columns 20 and 19 and the coded address of A register 42 stored in the destination columns 17 to 13. Stored in the control columns 12 to 6 is a coded instruction which will increment the memory address counters A1 and A2 and decrement the aforementioned L-1 loop control counter. Stored in the origin columns 5 to 1 is the coded address of the A1 counter which identifies the beginning address of output buffer 18. This microinstruction indicates that the first column of data information representative of output buffer 18 will be transferred via data output line 41 and main bus 37 to A register 42 under control of microinstruction controls 53. As each column of data is transferred, the microinstruction controls 53 increment the A1 and A2 memory address counters and decrement the loop control counter L-1.

Microprogram counter 48 is sequenced again and address 129 is transferred from microprogram 27 to instruction register 52. This microinstruction is another transfer (XF) instruction which has stored in the destination columns 17 to 13 the coded address of program level 1 which is the address in data storage means 20 indicated by memory address counter A2. Stored in the control columns 12 to 6 are instructions to decrement the L-1 counter after transfer of the information. It will be noted that memory address counter A2 could be incremented by the instruction in address 129 but has already been incremented by the previous instruction which requires column address modification. Stored in the origin columns 5 to 1 is the coded address of A register 42. This instruction will cause the information stored in A register 42 to be transferred to the arithmetic logic unit 34 via line 57 and to be transferred out of the arithmetic logic unit 34 via line 35 to main bus 37. The data on main bus 37 are transferred via input line 38 into program level 1 of data storage means 20 under control of the memory address counter A2 which indicates via line 39 the address of the first column of program level 1 in data storage means 20.

Microprogram counter 48 sequences again and causes microprogram 27 to step to address location 130. Microinstruction address location 130 contains a branch (BR) instruction in columns 20 and 19. The coded condition stored in columns 16 to 13 determines if the L-1 counter has reached the count of 0 as detected by the zero decoder 55, and as indicated to the branch controller 58 via line 56. If the branch controller 58 does not indicate that the branching condition has been met, branch line 59 is active and informs microinstruction controls 53 that the specified condition is not yet met. When the specified condition is not met, the branch address stored in columns 12 to 1 of the instruction 130 in instruction register 52 is transferred via line 54 to main bus 37 and via BR line 61 to microprogram counter 48. Microprogram counter 48 is jammed with the instruction address 128 which has been previously described. Microinstruction address 128 contains the transfer instruction which causes the next column of data information in output buffer 18 to be transferred to A register 42 and the address counters A1 and A2 to be incremented.

The microprogram counter 48 is automatically sequenced again and causes microprogram address 129 to be transferred from microprogram 27 into instruction register 52 as previously described. Microprogram address 129 contains the transfer (XF) instruction which causes the column of information from output buffer 18 to be transferred from the A register to the program level 1 column designated by memory address counter A2 and will cause the L-1 counter to be decremented before the microprogram counter 48 is sequenced again to bring the microprogram address 130 branching instruction into instruction register 52 to make the determination whether the transfer of information from output buffer 18 to A register 42 and from A register 42 to program level 1 in data storage means 20 has been completed. The above sequence is performed over and over again until complete transfer of information in output buffer 18 is transferred into program level 1 of data storage means 20. At the end of transfer, the branching operation condition does not exist and the program counter will be stepped to the next program address location set in the program.

The only microinstruction which was not explained in the above example is the arithmetic logic (AL) instruction. This instruction is used to perform data manipulation functions on the operands transferred to A register 42 or B register 43. The information transferred in these registers may be processed in the arithmetic unit 34 and the modified or unmodified output routed on line 35 and main bus 37 transferred to the specified destination.

One function of A register 42 and B register 43 is to examine the 0 column of a card image in output buffer 18 to determine the proper address for storing the program data information or the constant data information in data storage means 20. In the example explained above, the master card was originally read at read station 13 and the card image was created in output buffer 18. The information stored in column 0 of output buffer 18 was read or sensed by transferring the contents to A register 42. This information was subsequently employed to set memory address counter A1 which designated the proper address in memory location on data address line 39 to set the information which followed in columns 1 through 80 from output buffer 18 into a program or data storage level.

Microprocessor 26, shown in FIG. 7, serves to route data from one input-output element to another via main bus 37 by opening one output line and one or more input lines. Motion control logic 62 includes the electro-mechanical motion and sequencing mechanisms for the read station 13 and punch-printer station 15. These input-output (I/O) devices are directly controlled by microprogram 27. During operation of any of these I/O devices, there is generated an interrupt request on line 63 which indicates to the microprocessor 26 that all of the necessary conditions for data transfer between these I/O devices has been met, thus, synchronizing the microprocessor with the input-output device. Line 64 is the punch data word line. Line 65 is the print word line. Print position line 66 indicates that the printer is in the proper position for printing. Line 67 is the sense word line which indicates the condition of the machine photocells and other detecting devices. Line 68 is the read data word line. Lines 69 and 70 are the motion control words line which coordinate the movement of cards through the system.

Communication logic 72 is a remote control data entry apparatus from a computer or similar device. Input word line 73 and output word line 74 connect the communication logic 72 to the main bus 37.

Visual indicator logic 10A visually displays the column number on which a card is operably located and the operable program level from composite program area 21 which is active. Lines 75 and 76 are output lines from the main bus 37.

The keyboard of data entry means 10 is connected by a plurality of input and output lines to main bus 37. Operation word line 77 is an input line for operational words. Keyboard status word lines 78 and 79 are input and output lines which enter status words and operate indicator lights on keyboard control 10. Line 81 is a keyboard data word line for input to main bus 37. Line 82 is the keyboard control line for special functions which is an input to main bus 37. Input and the output lines from the punch station 62, printer station 62, reader station 62, communication logic and keyboard control 10 are scanned and operated by the microprocessor 26 under microinstruction controls 53.

Having explained a preferred embodiment of the present invention employing solid state logic, it will be understood that other forms of logic may be hard wired or implemented to accomplish the functions and results described. The preferred embodiment of the present invention has been explained and illustrated employing an indicia column 0 in which data identification, data address and chaining address information are combined with master card information. This indicia is conveniently placed in column zero which has not been heretofore employed in standard data card entry systems; however, data card entry systems may be modified to punch in and read out their indicia from other columns or other places on a standard card.

What is claimed is:

1. An internally programable data entry system for preparing data cards comprising:
    data entry means having manual and automatic entry load modes,
    card input means for receiving prepared cards and blank cards, said prepared cards having indicia means and data thereon,
    card reading means connected to said card input means for reading both indicia means and data entered on a said prepared card,
    said indicia means on said prepared card indicating whether said data on said card is program data or constant data,
    buffer output means connected to said card reading means for receiving and storing indicia means and data read from said card,
    control means responsive to said indicia means for automatically storing said indicia means and data from said buffer output means in a program data storage area or a constant data storage area, and
    program and constant data storage means for receiving and storing said program data and said constant data from said buffer output means under control of said control means as indicated by said indicia means.

2. An internally programmable data entry system as set forth in claim 1 wherein said indicia means on said card comprises an address indicative of the area in said program and constant data storage means for storing said constant data.

3. An internally programmable data entry system as set forth in claim 1 wherein said indicia means on said card comprises a plurality of program addresses.

4. An internally programmable data entry system as set forth in claim 3 wherein one of said program addresses indicates the area in said program and constant data storage means for storing said program data and another program address indicates the address of the next program stored in said program and constant data storage means chained to the operating program.

5. An internally programable data entry system as set forth in claim 4 wherein said program and constant data storage means further includes a composite program storage area for receiving and storing the operating program codes which are currently being employed by the data entry system.

6. An internally programable data entry system as set forth in claim 5 wherein said data entry means comprises a chaining-off switch for continuing the currently operating program and preventing any change to a chain associated program.

7. An internally programable data entry system as set forth in claim 1 wherein said data entry means comprises a feed key for feeding a prepared card from said card input means to said card reading means and a load switch for loading said indicia means and said data into said buffer output means.

8. An internally programable data entry system for preparing data cards comprising:
   data entry means having manual and automatic load modes,
   card input means for receiving prepared blank cards,
   card punch means connected to said card input means for entering indicia means and data into a blank card,
   input buffer means connected to said data entry means for receiving and storing indicia means and data from said data entry means,
   control means responsive to said indicia means and said data for automatically entering said indicia means and data from said input buffer means into said blank card, and
   manually operable keyboard means in said data entry means for setting a manual preparation mode and homing said card to the indicia position and for manually entering said indicia means and said data into said input buffer means.

9. An internally programable data entry system as set forth in claim 1 wherein said indicia means comprise punched entries in a column other than the data columns of a standard punch card.

10. An internally programable data entry system as set forth in claim 9 wherein said indicia means comprise punched entries in a column occurring before column 1 of a standard punch card.

* * * * *